Feb. 4, 1941. H. F. SMITH Re. 21,710

REFRIGERATING APPARATUS

Original Filed Aug. 19, 1936 2 Sheets-Sheet 1

INVENTOR.
HARRY F. SMITH.

BY
Spencer, Hardman and Fehr.
HIS ATTORNEYS.

Feb. 4, 1941. H. F. SMITH Re. 21,710

REFRIGERATING APPARATUS

Original Filed Aug. 19, 1936 2 Sheets-Sheet 2

INVENTOR.
HARRY F. SMITH.

BY
Spencer, Hardman and Fehr.
HIS ATTORNEYS.

Reissued Feb. 4, 1941

Re. 21,710

UNITED STATES PATENT OFFICE 21,710

REFRIGERATING APPARATUS

Harry F. Smith, Lexington, Ohio, assignor to General Motors Corporation, Dayton, Ohio, a corporation of Delaware Original No. 2,085,172, dated June 29, 1937, Serial No. 96,823, August 19, 1936. Application for reissue June 20, 1939, Serial No. 280,130

11 Claims. (Cl. 62—4)

This invention relates to refrigeration and particularly to refrigerating systems having a safety device incorporated therein.

An object of the present invention is to provide refrigerating apparatus particularly of the type for cooling or conditioning air within a room which apparatus is provided with means for preventing condensate water ordinarily flowing therefrom from creating unsightly and/or damaging results.

Another object of the invention is to provide a refrigerating apparatus of the air cooling type with an automatically operated means for stopping the operation thereof when abnormal or undesirable conditions occur.

In carrying out the foregoing objects it is a still further object of the invention to provide a refrigerating apparatus with a means for rendering the apparatus inoperative which means is normally ineffective and rendered effective by an accumulation of condensate water therein.

Further objects and advantages of the present invention will be apparent from the following description, reference being had to the accompanying drawings, wherein a preferred form of the present invention is clearly shown.

Figure 3:
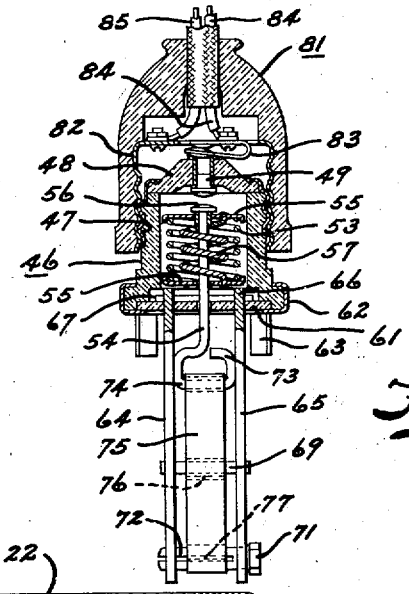
Fig. 3 is a sectional view taken on the line 3—3 of Fig. 2.
Figure 1:
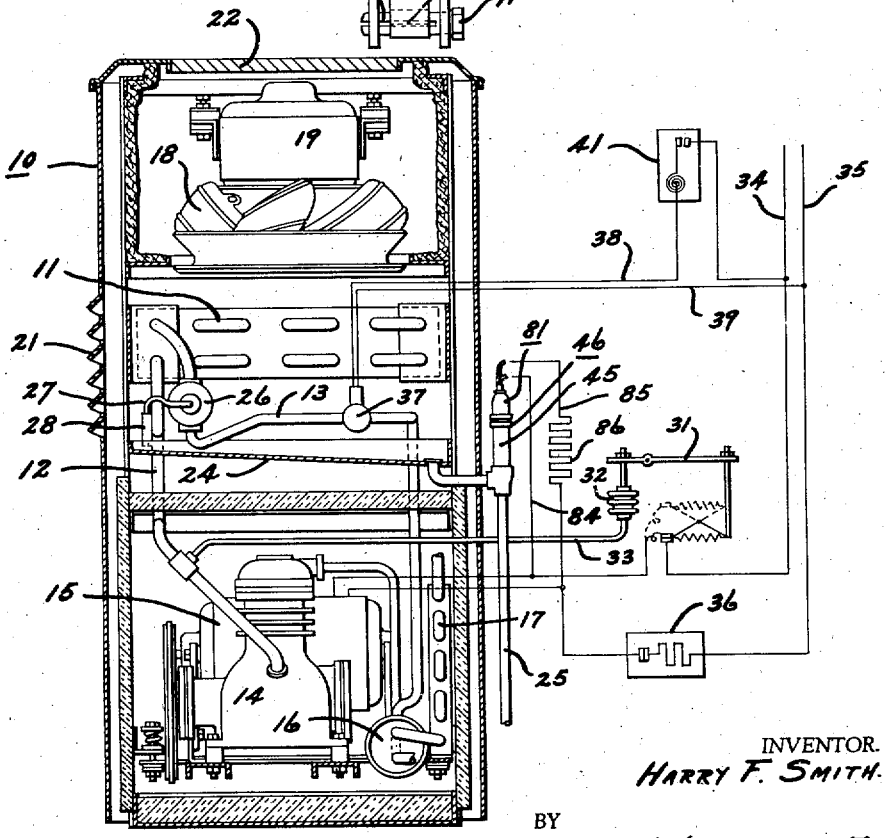
Fig. 1 is a view partly in section and partly diagrammatic, showing a refrigerating apparatus having the present invention embodied therein.
Figure 2:
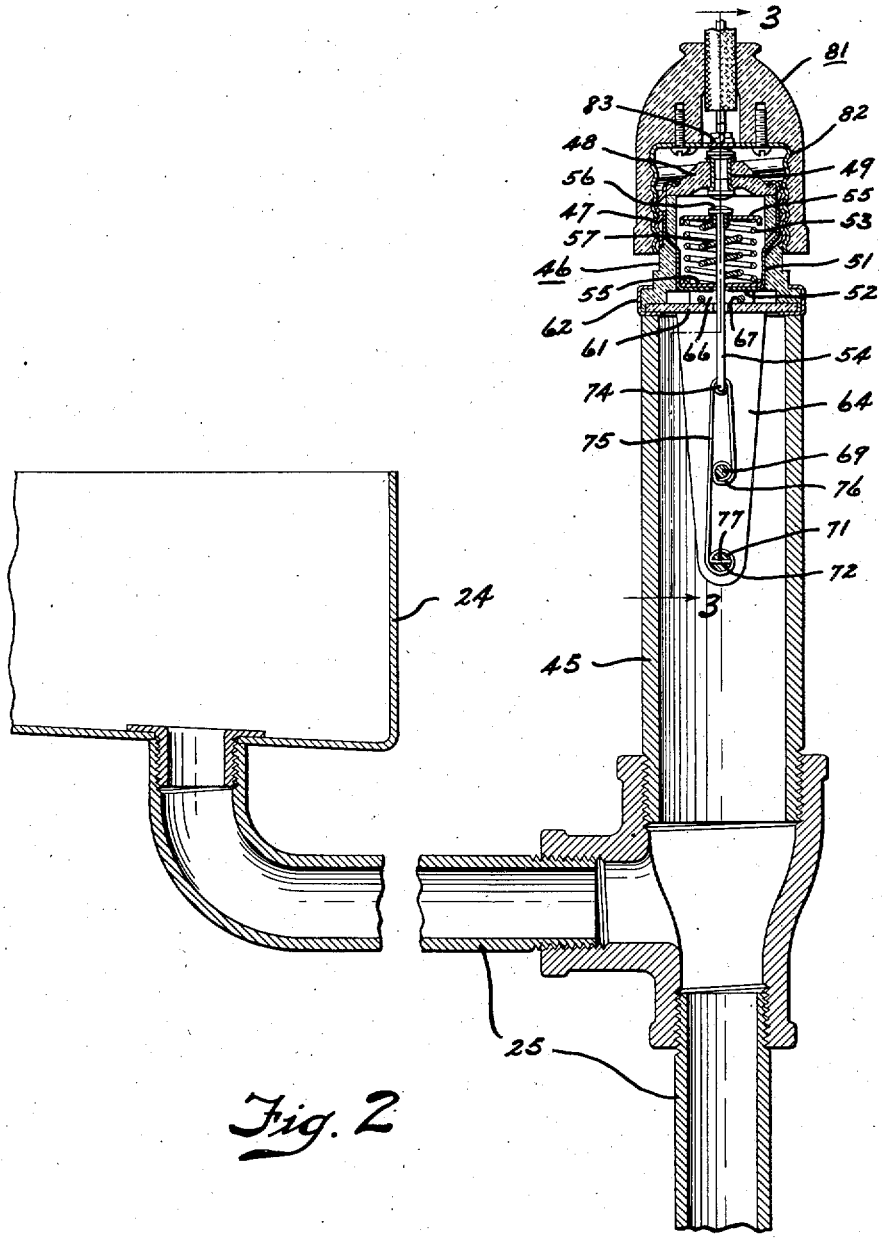
Fig. 2 is an enlarged sectional view of a part of the apparatus shown in Fig. 1.

Referring to the drawings, for illustrating the present invention, I have shown in Fig. 1 thereof a room cooling apparatus housed within a cabinet generally represented by the reference character 10. Cabinet 10 has a closed refrigerating system mounted therein and the system includes an evaporator 11 having a gaseous refrigerant conduit 12 and a liquid refrigerant conduit 13 connecting same to a refrigerant liquefying and circulating unit. The refrigerant liquefying and circulating unit includes a compressor 14 and an electric motor 15 operatively connected to the compressor through suitable belt and pulley connections. The unit also includes a condenser 16 to which conduit 13 is connected and this condenser may be cooled in any desirable or well-known manner. In the present showing of the apparatus a water flow circuit is employed to cool the condenser 16 and this circuit includes a coil 17 mounted in the compartment housing the refrigerant liquefying and circulating unit and is utilized to remove heat of compression from the compartment. The refrigerant liquefying and circulating unit is preferably mounted upon a base which is suspendingly supported in the lower compartment of the cabinet. Evaporator 11 is disposed horizontally within cabinet 10 intermediate the top and bottom thereof. A fan 18 operatively connected to an electric motor 19 is mounted in the uppermost portion of cabinet 10. This fan 18 is adapted to draw air into cabinet 10, through suitable louvres or openings 21 prvided in a side wall thereof, and to force the air over evaporator 11 where it is chilled or cooled by the refrigerating effect produced by the evaporator. The cooled air is caused to flow by fan 18 out of the cabinet or casing 10 into the room to be cooled through openings 22 provided in the top wall of cabinet 10. In cooling air passing thereover the evaporator 11 withdraws moisture from the air and a pan or receptacle 24 is mounted below the evaporator to catch moisture dripping therefrom. A pipe 25 is connected to pan 24 and extends downwardly therefrom to convey, by gravity flow, the condensate water caught in pan 24 to a suitable drain source.

Liquid refrigerant flowing from the condenser 16 of the refrigerating system into evaporator 11 is controlled by an expansion valve 26. Valve 26 has a pipe connection 27 with a thermostat bulb 28 mounted upon the gaseous refrigerant conduit 12 and responsive to the temperature of refrigerant flowing therethrough. Operation of the refrigerant liquefying and circulating unit is controlled by a switch 31 preferably of the snap acting type actuated by an expansible and contractible bellows 32 having a pipe connection 33 with the gaseous refrigerant conduit 12 and responsive to pressures in the low side of the refrigerating system. Switch 31 is interposed in the one power line of the pair 34 and 35 thereof leading to motor 15. A thermal overload switch 36 of any suitable or conventional design is interposed in the power line 35 leading to motor 15 and is adapted to break or open the circuit to the motor when the resistance to flow of electric current through the motor increases to an abnormal degree to prevent so-called burning of the motor under heavy loads. A magnetic valve 37 is interposed in the refrigerant conduit 13 of the closed refrigerating system and is electrically connected by wires 38 and 39 to a thermostatic switch 41 and to the power lines 34 and 35. Switch 41 is adapted to be positioned in the room to be cooled and is actuated in response to temperatures therein to open or close valve 37 to thereby permit or prevent flow of liquid refrigerant to expansion valve 26. The switch 41 may also control operation of motor 19 and consequently fan 18 so that when valve 37 is opened the fan creates a circulation of air over the evaporator and into the room to be cooled. The apparatus thus far described is conventional and well-known to those skilled in the art and no further or detailed description thereof is believed necessary herein.

Since my invention is directed to an improved apparatus of the type described and pertains to the stopping of the apparatus when certain abnormal or undesirable conditions occur during operation thereof I will now describe this improved system. While the moisture removed from the air cooled by evaporator 11 of the refrigerating system is adapted to drip from the evaporator into the pan or receptacle 24 and flow by gravity through pipe 25 to a drain such pipes or drains quite frequently get stopped up or become clogged and prevent the flow of water therethrough. If the refrigerating system is permitted to continue operation after the drain becomes ineffective for carrying drip water of condensation away from the cabinet of the refrigerating apparatus, an abnormal condition occurs in that drip water accumulates in the drip pan or receptacle 24 and will overflow same. The drip water upon overflowing the pan 24 is likely to flow on or into the electric motor 15 of the refrigerant liquefying and circulating unit, or into other electrical elements of the apparatus disposed below pan 24, and will cause short-circuiting or burning of parts of the motor or of the other electrical elements. Therefore it is highly important that the refrigerating system of the apparatus be rendered inoperative when such abnormal condition occurs until after this condition has been remedied or corrected.

I interpose an upstanding pipe 45 in the drain pipe 25 and dispose a safety device in pipe 45 which will, when water accumulates in pan 24 to a point near that to cause overflow of the pan, render the refrigerating system inoperative to cease cooling of the air so as to indicate to the user or those present in the room being cooled that some abnormal condition has occured that must be corrected before the apparatus will function to produce the desired results. Such a safety device may be placed directly in the pan 24 if desired, but to simplify the construction of a device of this type and to insure its operation only at the time required I prefer to mount the device outside the pan 24. Therefore the device disclosed in the present disclosure comprises an electric element generally represented by the reference character 46 and having an outer threaded metal terminal 47 insulated by an insulation or the like plug 48 from a centrally located terminal 49. The plug 48 is hollow and has metal members 51 extending through its side wall into contact with the terminal 47. The inner ends of the metal members 51 are bent as at 52 to form a support or abutment for a coil spring 53. Spring 53 surrounds a metal rod 54 and is confined within the hollowed out portion of plug 48 between cup-like metal washers 55 the upper one of which is secured under a head 56 formed on rod 54. A wire 57 coiled around rod 54 has its upper end soldered to the upper metal washer 55 and has its other end soldered or otherwise suitably secured to the lower washer 55 which lies in contact with the ends 52 of members 51. It will therefore be seen that the threaded metal outer terminal 47 is conductively connected with the head 56 of rod 54 through the metal pieces 51, lower washer 55, wire 57 and the collar surrounding the upper end of rod 54. The enlarged lower end of element 46 has a plate-like washer of insulating material 61 secured thereto by a metal collar 62 crimped over a shoulder formed on the element 46 to close the hollowed out or open-ended portion thereof. This collar 62 is provided with a plurality of depending legs 63 which are utilized for resiliently engaging the outer upper end of pipe 45 to removably secure the element 46 thereto. A pair of vertically disposed plates 64 and 65 have an upper shoulder portion 66 thereof extended through the insulating washer 61 and secured thereto by pins 67. The pair of plates 64 and 65 are held in spaced apart relation by a stud 69 which is riveted or otherwise suitably secured thereto intermediate the top and bottom portions thereof. There is a rotatable member 71 below stud 69 which is threaded at one of its ends into the plate 65 and has its other end extended through a suitable opening provided in plate 64. The member 71 is split as at 72 for a purpose to be presently described. The lower end of rod 54 is bent outwardly and around against itself as at 73 to form an eye portion having a straight shank part 74 extending horizontally between the plates 64 and 65. A strip of paper 75, preferably of a character that is soft and will readily absorb water to thus cause same to lose its tensile strength so as to be easily torn such, for example, as ordinary newspaper or thin blotting paper, has its one end 76 coiled in overlapping relation around the stud 69 so as to hold this end against rotation or movement relative to stud 69. The strip of paper 75 is then passed through the eye portion formed by rod 54 while the rod is held in a position such as shown in the drawings and the paper is tightly stretched between the stud 69 and shank part 74 of rod 54 to separate the head 56 formed on rod 54 from the terminal 49. The opposite end 77 of paper strip 75 is then placed in the slot 72 of member 71 and member 71 is threaded into plate 65. Rotation of member 71 causes the paper adjacent the end 77 thereof to be wound around the member 71 to thereby tightly stretch the paper strip at points intermediate its ends 76 and 77. The paper strip 75 while being maintained in the stretched position shown in the drawings holds the rod 54 in a downward position against the tension of spring 53 which is compressed between the washers 55.

Another element in the form of a conventional electrical socket 81 is threaded upon the threaded terminal 47 of element 46 and is provided with terminals 82 and 83 having wires 84 and 85 repectively connected to and extending therefrom. Wire 84 is connected in parallel circuit relation with the motor 15 of the refrigerating system by being secured to the power line 34 at a point between motor 15 and switch 31. Wire 85 is also connected in parallel circuit relation with the motor 15 by being secured to the power line 35 at a point between motor 15 and the terminal switch 36. I interpose an electrical resistance unit 86, of any suitable or conventional construction and design, in the wire 85 at a point intermediate its connection with the power line 35 and its connection with element or socket 81, to complete the apparatus.

In the normal operation of the apparatus the evaporator 11 produces a refrigerating effect and cools air of the room in which the apparatus is located which air is circulated thereover by operation of fan 18. The switch 31 controls the starting and stopping of motor 15 to maintain the evaporator between predetermined temperatures. The thermostat switch 41 controls the flow of liquid refrigerant to the expansion valve 26 and consequently evaporator 11 in response to temperature conditions existing in the room. Moisture removed from the air during cooling thereof drips from the evaporator 11 into the pan or receptacle 24 and this drip water normally flows to the sewer through the drain pipe 25. In the ordinary installation of this type should the drain pipe become stopped up or clogged with foreign matter the drip water would overflow the pan 24 upon continued operation of the refrigerating system and would flow on or into the motor 15 or on other electrical elements disposed below the pan. The overflow or drip water may cause the motor or other electrical elements to be short-circuited and burned beyond repair and in addition, this water flows upon and over the floor of the room in which the apparatus is located. However, should water accumulating in the drip pan 24 of the present apparatus rise to an abnormal height this water will also rise the same height in the pipe 45, extending upwardly from the drain pipe 25, and will contact and wet the paper strip 75 of the safety device. The water upon soaking the paper 75 destroys its tensile strength and causes same to tear or break. Upon breaking of the paper strip 75 coil spring 53 in the safety device disclosed forces rod 54 upwardly and the head 56 formed thereon therefore moves into engagement with the terminal 49 in the plug element 46. Obviously the electric circuit through terminals 49, 83, wire 84, terminals 47, 82 and wire 85 is completed across the power lines 34 and 35 between the thermal overload protecting switch 36 and motor 15. Current flowing through this completed circuit must pass through the resistance unit 86 interposed therein and the unit 86 thereby creates an abnormal electrical load which is thrown upon or through the thermal overload protector 36 and heats same to cause it to trip or open the motor circuit through power lines 34 and 35. Opening of the power lines 34 and 35 obviously breaks the circuit to motor 15 and switch 31 is thereby no longer effective to complete the circuit, thus motor 15 and consequently the refrigerant liquefying and circulating unit is rendered inoperative. The temperature of the room in which the apparatus is located will increase above its normal high temperature limit to thus indicate that the refrigerating system is inoperative. By rendering the refrigerating system inoperative in this manner further condensation of moisture on and flow of drip water from evaporator 11 into pan 24 is prevented and overflow of this pan is thereby eliminated. The system will, of course, remain inoperative until the drain pipe 25 has been opened or cleaned out to convey drip water from the apparatus. After the drain pipe 25 has been opened or cleaned out the paper strip 75 in the element 46 of the safety device is replaced by a new strip so that the terminals 47 and 49 of the safety device will be maintained in spaced apart relation to keep the circuit through wires 84 and 85 open. The thermal overload switch 36 after having been permitted to cool is reset to complete the electric circuit therethrough from power lines 34 and 35 to motor 15 and switch 31 to again render the apparatus operative.

It is to be understood that in a system where the thermal overload switch 36 is not employed the safety device comprising the element 46 and 81 may be of a modified construction and arrangement whereby the circuit from the power lines 34 and 35 may be extended through the device and the device will normally complete this circuit but upon an abnormal accumulation of water in pan 24 the device will break or open the power circuit leading to switch 31 and motor 15. Obviously therefore other arrangements are well within the scope of the invention and while I have disclosed a preferred installation employing a conventional thermal switch 36 to take care of overloads placed upon the motor of the refrigerating system I do not wish to be restricted to the specific installation shown nor to the specific type or construction of safety device disclosed as will be apparent from the appended claims.

From the foregoing it will be apparent that I have provided an improved apparatus of the type adapted to cool and circulate air within a room to be cooled and that the apparatus by having the safety device described incorporated therein overcomes certain difficulties or objections encountered in the use and operation of conventional apparatuses of this type. The safety device of my improved apparatus is normally ineffective and rendered effective to cause inoperativeness of the refrigerating system automatically by a predetermined accumulation of drip water in the water receptacle. The safety device is inexpensive, simple and can be readily reset after the paper strip therein has been torn or broken by being wetted by the drip water. By incorporating the safety device in the apparatus an improved refrigerating system is provided in that the device cooperates with other safety devices and elements in the system to render the system operative at all times except when an abnormal condition occurs which is likely to cause considerable damage to the system or to the building in which the system is installed.

While the form of embodiment of the invention as herein disclosed, constitutes a preferred form, it is to be understood that other forms might be adopted, all coming within the scope of the claims which follow.

What is claimed is as follows:

1. In combination, an apparatus including an element which dehumidifies air, means for circulating a medium through said element to cause said dehumidification of the air, means for collecting condensate water from said element and for normally conveying the water away from said apparatus, and normally ineffective means rendered effective automatically in response to a predetermined accumulation of water in said collecting and conveying means for rendering said circulating means inoperative.

2. In combination, an apparatus including an element which dehumidifies air, means for circulating a medium through said element to cause said dehumidification of the air, means for collecting condensate water from said element and for normally conveying the water away from said apparatus, normally ineffective means for rendering said circulating means inoperative, and means associated with said normally ineffective means actuated automatically in response to a predetermined accumulation of water in said collecting and conveying means for rendering said normally ineffective means effective.

3. In combination, an apparatus including an element which dehumidifies air, means for circulating a medium through said element to cause said dehumidification of the air, means for collecting condensate water from said element and for normally conveying the water away from said apparatus, and means for rendering said circulating means inoperative, said last named means being normally ineffective and rendered effective by accumulation of water in said collecting and conveying means.

4. In combination, an apparatus including an element which dehumidifies air, means for circulating a medium through said element to cause said dehumidification of the air, means for collecting condensate water from said element and for normally conveying the water away from said apparatus, said circulating means including a motor and an electric circuit leading thereto, means interposed in said electric circuit for controlling operation of said motor, a switch interposed in said electric circuit between said control means and said motor, and means responsive to a predetermined accumulation of water in said collecting and conveying means for actuating said switch to render said motor inoperative.

5. In combination, an apparatus including an element which dehumidifies air, means for circulating a medium through said element to cause said dehumidification of the air, means for collecting condensate water from said element and for normally conveying the water away from said apparatus, said circulating means including a motor and an electric circuit leading thereto, means interposed in said electric circuit for controlling operation of said motor, a normally closed thermal overload means interposed in said electric circuit, a switch interposed in said electric circuit between said thermal overload means and said motor, and means responsive to a predetermined accumulation of water in said collecting and conveying means for actuating said switch to cause opening of said normally closed thermal overload means to thereby render said motor inoperative.

6. In combination, an apparatus including an element which dehumidifies air, means for circulating a medium through said element to cause said dehumidification of the air, means for collecting condensate water from said element and for normally conveying the water away from said apparatus, said circulating means including a motor and an electric circuit leading thereto, means interposed in said electric circuit for controlling operation of said motor, a normally closed thermal overload means interposed in said electric circuit, a normally open switch interposed in said electric circuit between said thermal overload means and said motor, and means responsive to a predetermined accumulation of water in said collecting and conveying means for closing said normally open switch to cause opening of said normally closed thermal overload means to thereby render said motor inoperative.

7. In combination, an apparatus including an element which dehumidifies air, means for circulating a medium through said element to cause said dehumidification of the air, means for collecting condensate water from said element and for normally conveying the water away from said apparatus, said circulating means including a motor and an electric circuit leading thereto, means interposed in said electric circuit for controlling operation of said motor, a normally closed thermal overload means interposed in said electric circuit, a switch interposed in said electric circuit between said thermal overload means and said motor, a resistance unit interposed in said electric circuit between said switch and said thermal overload means, and means responsive to a predetermined accumulation of water in said collecting and conveying means for actuating said switch to energize said resistance unit and cause opening of said normally closed thermal overload means to thereby render said motor inoperative.

8. In combination, an apparatus including an element which dehumidifies air, means for circulating a medium through said element to cause said dehumidification of the air, means for collecting condensate water from said element and for normally conveying the water away from said apparatus, said circulating means including a motor and an electric circuit leading thereto, means interposed in said electric circuit for controlling operation of said motor, a normally closed thermal overload means interposed in said electric circuit, a normally open switch interposed in said electric circuit between said thermal overload means and said motor, a resistance unit interposed in said electric circuit between said switch and said thermal overload means, and means responsive to a predetermined accumulation of water in said collecting and conveying means for closing said normally open switch to energize said resistance unit and cause opening of said normally closed thermal overload means to thereby render said motor inoperative.

9. In combination, an apparatus including an element which dehumidifies air, means for circulating a medium through said element to cause said dehumidification of the air, means for collecting condensate water from said element and for normally conveying the water away from said apparatus, and normally ineffective means rendered effective automatically in response to a predetermined accumulation of water in said collecting and conveying means for preventing further accumulation of condensate water in said collecting and conveying means above said predetermined accumulated amount thereof.

10. In combination, an apparatus including an element which dehumidifies air, means for circulating a medium through said element to cause said dehumidification of the air, means for collecting condensate water from said element and for normally conveying the water away from said apparatus, and normally ineffective means rendered effective automatically in response to a predetermined accumulation of water in said collecting and conveying means for causing said element to discontinue its dehumidification of the air to thereby prevent accumulation of condensate water in said collecting and conveying means above said predetermined accumulated amount thereof.

11. An air conditioning apparatus comprising an air cooling unit, a refrigerant circulating unit connected to said cooling unit, collecting means for collecting condensate from said air cooling unit, and means preventing the operation of said circulating unit upon the accumulation of a predetermined amount of liquid in said collecting means.

HARRY F. SMITH.